United States Patent
Gassner et al.

(10) Patent No.: US 12,488,137 B1
(45) Date of Patent: Dec. 2, 2025

(54) SYSTEMS AND METHODS FOR A HIERARCHICAL RECORD-LEVEL SECURITY ARCHITECTURE

(71) Applicant: Veeva Systems Inc., Pleasanton, CA (US)

(72) Inventors: Peter Gassner, Pleasanton, CA (US); Larry Jovanovic, Chicago, IL (US); Andrew Han, Needham, MA (US)

(73) Assignee: Veeva Systems Inc., Pleasanton, CA (US)

( * ) Notice: Subject to any disclaimer, the term of this patent is extended or adjusted under 35 U.S.C. 154(b) by 0 days.

(21) Appl. No.: 19/170,041

(22) Filed: Apr. 3, 2025

(51) Int. Cl.
*G06F 21/62* (2013.01)

(52) U.S. Cl.
CPC ...... *G06F 21/6227* (2013.01); *G06F 21/6209* (2013.01)

(58) Field of Classification Search
CPC .. G06F 21/62; G06F 21/6227; G06F 21/6209; G06F 21/36
See application file for complete search history.

(56) References Cited

U.S. PATENT DOCUMENTS

| | | | |
|---|---|---|---|
| 7,917,940 B2 * | 3/2011 | Holdsworth | G06F 21/6218 713/170 |
| 8,095,531 B2 | 1/2012 | Weissman et al. | |
| 10,783,262 B2 * | 9/2020 | Goyal | G06F 21/6218 |
| 2011/0173455 A1 * | 7/2011 | Spalka | H04L 9/0869 713/189 |
| 2016/0210470 A1 * | 7/2016 | Rozenberg | G06F 21/6227 |
| 2020/0380156 A1 * | 12/2020 | Garg | G06F 21/64 |

* cited by examiner

*Primary Examiner* — Jayesh M Jhaveri

(57) ABSTRACT

A method for providing secure and hierarchical access to an object record includes generating a tree data record including a root node data record and a multiple dependent node data records. The method further include receiving a request to perform an action on the object record. The method further includes determining the first dependent node data record based on the user account being assigned to the first dependent node data record and determining the second dependent node data record based on the second dependent node data record depending from the first dependent node data record. The method further includes determining the at least one node tag of the object record is associated with at least one of the first dependent node data record or the second dependent node data record. The method further includes executing the action on the object record.

20 Claims, 9 Drawing Sheets

900

My Accounts > Test

Professional: Tree Security Test (Active)

▼ Sharing Settings (?) ← 904

Please select a user to view assigned roles. Learn more

▽ All Roles ▼    Larry Jovanovic ▼
       ↖908           ↖912

Role ▲
Editor
  ↖916

Details
Contact Information and Preferences
Identifiers
Member Of (0)
Addresses (0)
Account Territories (0)
Calls (0)
Event Attendees (0)
Medical Inquiries (0)
Clinical Trials (0)
Publications (0)
Suggestions (0)
Sent Email (0)
Survey Targets (0)

FIG. 9

SYSTEMS AND METHODS FOR A HIERARCHICAL RECORD-LEVEL SECURITY ARCHITECTURE

TECHNICAL FIELD

The present disclosure relates to systems and methods for a hierarchical record-level security architecture.

BACKGROUND

Researchers, scientists, industry players, academics, government regulators, and other stakeholders are increasingly in need of efficient and simple ways to secure data records in a hierarchical format.

SUMMARY

One embodiment relates to a method for providing secure and hierarchical access to an object record. The method includes generating a tree data record including a root node data record and a multiple dependent node data records. The multiple dependent node data records includes a first dependent node data record and a second dependent node data record depending from the first dependent node data record. The method further includes receiving a user rule criteria and determining a user account fulfills the user rule criteria. The method further includes assigning, in response to the user account fulfilling the user rule criteria, the user account to the first dependent node data record. The method further includes assigning the object record to at least one dependent node data record of the multiple dependent node data records or the root data record. The method further includes modifying the object record to include at least one node tag. The method further include receiving a request to perform an action on the object record. The request is received from a client computing device associated with the user account. The method further includes determining the first dependent node data record based on the user account being assigned to the first dependent node data record and determining the second dependent node data record based on the second dependent node data record depending from the first dependent node data record. The method further includes determining the at least one node tag of the object record is associated with at least one of the first dependent node data record or the second dependent node data record. The method further includes executing, in response to determining the at least one node tag of the object record is associated with at least one of the first dependent node data record or the second dependent node data record, the action on the object record.

In some embodiments, the method further includes receiving an object record rule criteria. In some embodiments, the method further includes determining the object record fulfills the object record rule criteria. In some embodiments, the object record is assigned to at least one dependent node data record of the plurality of dependent node data records or the root data record in response to the object record fulfilling the object record rule criteria.

In some embodiments, the method further includes receiving a static object record assignment. In some embodiments, the object record is assigned to at least one dependent node data record of the plurality of dependent node data records or the root data record based on the static object record assignment.

In some embodiments, the multiple dependent node data records further includes a third dependent node data record depending from the second dependent node data record and a fourth dependent node data record depending from the second dependent node data record. In some embodiments, the method further includes determining the third dependent node data record based on the third dependent node data record depending from the second dependent node data record. In some embodiments, the method further includes determining the fourth dependent node data record based on the fourth dependent node data record depending from the second dependent node data record.

In some embodiments, each dependent node data record includes a self-referencing field which includes a link to a related dependent node data record.

In some embodiments, the user account includes a record privilege. In some embodiments, the method further includes determining the record privilege of the user account meets the action of the request.

In some embodiments, the action is a view action, a delete action, or an update action.

In some embodiments, the user rule criteria includes at least one of: a region or an application.

In some embodiments, the user rule criteria includes an application. In some embodiments, the object record is associated with the application. In some embodiments, the application is at least one of: a research and development application, a clinical trial application, a quality application, a medical communications application, and a sales application.

In some embodiments, the first dependent node data record depends from the root node data record.

Another embodiment relates to content management system including a content management server configured to generate a tree data record including a root node data record and multiple dependent node data records. The multiple dependent node data records includes a first dependent node data record and a second dependent node data record depending from the first dependent node data record. The content management system is further configured to assign the user account to the first dependent node data record; receive an object record rule criteria; determine the object record fulfills the object record rule criteria; assign, in response to the object record fulfilling the object record rule criteria, the object record to at least one dependent node data record of the multiple dependent node data records or the root data record; modify the object record to include a link to at least one group; and receive a request to perform an action on the object record. The request is received from a client computing device associated with the user account. The content management server is further configured to determine the first dependent node data record based on the user account being assigned to the first dependent node data record; determine the second dependent node data record based on the second dependent node data record depending from the first dependent node data record; determine at least one of the first dependent node data record or the second dependent node data record are associated with the at least one group of the object record; and execute, in response to determining the at least one of the first dependent node data record or the second dependent node data record are associated with the at least one group of the object record, the action on the object record.

In some embodiments, the content management server is further configured to: receive a user rule criteria; and determine the user account fulfills the user rule criteria. In some embodiments, the user account is assigned to the first dependent node data record in response to the user account fulfilling the user rule criteria.

In some embodiments, the content management server is further configured to receive a static user assignment. In some embodiments, the user account is assigned to the first dependent node data record based on the static user assignment.

In some embodiments, the multiple dependent node data records further includes a third dependent node data record depending from the second dependent node data record and a fourth dependent node data record depending from the second dependent node data record. In some embodiments, the content management server is further configured to: determine the third dependent node data record based on the third dependent node data record depending from the second dependent node data record; and determine the fourth dependent node data record based on the fourth dependent node data record depending from the second dependent node data record.

In some embodiments, each dependent node data record includes a self-referencing field which includes a link to a related dependent node data record.

In some embodiments, the user account includes a record privilege. In some embodiments, the content management server is further configured to determine the record privilege of the user account meets the action of the request.

In some embodiments, the action is a view action, a delete action, or an update action.

In some embodiments, the object record rule criteria includes at least one of: a field of the object record, a region, or an application.

In some embodiments, the object record rule criteria includes an application. In some embodiments, the object record is associated with the application. In some embodiments, the application is at least one of: a research and development application, a clinical trial application, a quality application, a medical communications application, or a sales application.

In some embodiments, the first dependent node data record depends from the root node data record.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

FIG. 9 is an illustration of a user interface displayed by the enterprise content management architecture of FIG. 1 to determine a user account role.

DETAILED DESCRIPTION

Figure 1:
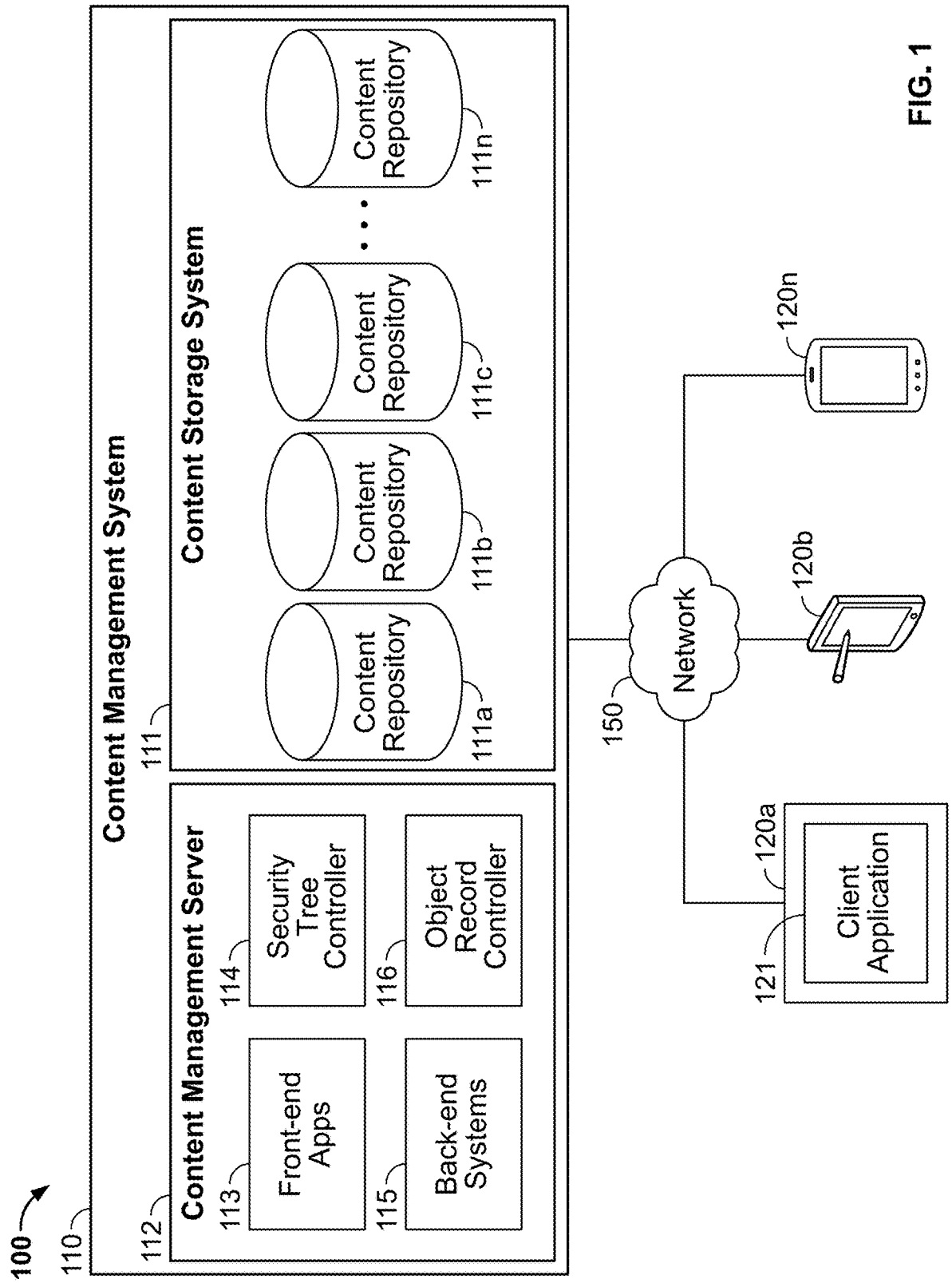
FIG. 1 illustrates an example high level block diagram of an enterprise content management architecture, according to an example embodiment.

Referring generally to the figures, systems and methods for a hierarchical record-level security architecture are disclosed. The systems and methods described herein provide an improved security architecture that utilizes a hierarchical security tree including a root node and multiple dependent nodes. In operation, the present systems and methods may generate the security tree, generate a root node and generate the multiple dependent nodes. The systems and methods may then assign user accounts to one or more nodes based on specific static user assignment and user assignment rules, and then assign object records to one or more nodes based on specific static object record assignments and object record rule(s). As object records are assigned to the nodes, they may be tagged or modified to indicate each node which has access to the security tree.

By utilizing a hierarchical security structure with self-referencing nodes, the present systems and methods provide for more secure object record access that cascades, such that users assigned to the root node, have access to all object records assigned to the security tree, and users assigned to the lowest-level nodes (e.g., the leaves of the security tree) have access to only the object records assigned to their specific lowest-level nodes. Likewise, because the present systems and methods utilize a tree record including multiple node data records that each includes a self-referencing field, the present systems and methods can faster query and search the nodes. For instance, databases are increasingly optimized for handling recursive queries, which are often used to traverse self-referencing relationships, and certain techniques like materialized path and closure table patterns have emerged to enhance the efficiency of querying hierarchical data. Accordingly, by including the self-referencing field, the present systems and methods can provide for improved record querying.

Additionally, by allowing for both static assignments and rules-based assignments (for object records and users), the present systems and methods provide for both simple assignments (e.g., as set in the static assignments) and complex assignments (e.g., as set via the rules) to assign data records to the security tree, which provides for an improved security architecture that can be used to handle the types of assignments users may specify. For instance, a high-level user may be statically assigned to the root node, whereas lower-level user's with a specific job title and region may be assigned to dependent nodes based on their job title and region matching a pre-specified job title and region.

Moreover, by tagging the object records with the corresponding nodes when the object records are assigned to the security tree, the present systems and methods provide for improved data processing and faster more secure checks at runtime. For instance, the present systems and methods tag each object record with each node that has access to the object record, when the object record is assigned to the security tree, instead of traversing the security tree at runtime. By doing so, the present systems provide for faster processing at runtime and quicker data querying. For instance, each node can include up to 25,000 assigned object records. Accordingly, traversing the security tree for object records at runtime can result in delays and slow response from the system. Accordingly, the present systems and methods tag the object records with the corresponding nodes when the object records are assigned to the security tree, thereby providing for a faster and more responsive runtime, while still achieving secure data protection through the security architecture described herein.

Referring now to FIG. 1 an enterprise content management system 100 is shown, according to an example embodiment. The enterprise may be a business, an organization, or the like. As shown, the system 100 may include a content management system 110, and a plurality of client computing devices 120a, 120b, . . . 120n, coupled to each other via a network 150. The content management system 110 may include a content storage system 111 and a content management server 112. The content storage system 111 may have two or more content repositories, e.g., 111a, 111b, 111c . . . and 111n.

The network 150 communicably and operably couples the content management system 110 and the client computing devices 120a-120n such that communicable and operable computing may be provided between the content management system 110 and the client computing devices 120a-120n over the network 150. In various embodiments, the network 150 includes any combination of a local area network (LAN), an intranet, the Internet, or any other suitable communications network, directly or through another interface.

The client computing devices 120a-120n may be any machine or system that is used by a user to access the content management system 110 via the network 150, and may be any commercially available computing devices including laptop computers, desktop computers, mobile phones, smart phones, tablet computers, netbooks, and personal digital assistants (PDAs). A client application 121 may run from a client computing device, e.g., 120a, and access content in the content management system 110 via the network 150. In some embodiments each client computing device 120a-120n may include a network interface (not shown to communicate with the network) and a processing circuit (not shown) to process data (e.g., data records, change data records) and/or generate requests. The client computing devices 120a-120n are illustrated in more detail in FIG. 4.

The content storage system 111 may store content that client applications (e.g., 121) in client computing devices 120a-120n may access and may be any commercially available storage devices. Each content repository (e.g., 111a, 111b, 111c or 111n) may store content, including data records, change data records, an archive index file, and the like. Data records may be stored in the content repositories 111a-111n, but each tenant's data may be segregated from other tenants' data in the content storage system 111 by being stored in a separate content repository. In some embodiments, each content repository 111a-111n may include multiple additional repositories (not shown). In this regard, each content repository 111a-111n may be a group or set of repositories associated with a specific customer or tenant.

The content management server 112 is typically a remote computer system accessible over a remote or local network, such as the network 150. The content management server 112 could be any commercially available computing devices. A client application (e.g., 121) process may be active on one or more client computing devices 120a-120n. The corresponding server process may be active on the content management server 112, as one of the front-end applications 113 described with reference to FIG. 2. The client application process and the corresponding server process may communicate with each other over the network 150, thus providing distributed functionality and allowing multiple client applications to take advantage of the information-gathering capabilities of the content management system 110.

In some embodiments, the content management server 112 may include a security tree controller 114 which may generate, maintain, an update security trees for specific tenants. For instance, the security tree controller 114 may receive a request to generate a security tree (also referred to as a tree data record). The request may identify the number of levels, assigned users, and assigned objects. Then, the security tree controller 114 may generate the tree data record including each specific node data object, and assign the user accounts and data records to the corresponding node.

Additionally, the content management server 112 may include an object record controller 116, which may retrieve, query, and execute actions (e.g., view, create, modify, delete, etc.) object records from the content repositories 111a-n. For instance, the object record controller 116 may receive a request to delete a specific object record from a specific user account. Accordingly, the data record controller 116 may determine if the user account has the correct permission(s) or roles (based on the tree data record, as will described further herein). If the user has the corresponding permissions or role, the data record controller 116 may execute the action.

Although the front-end applications 113, the back-end systems 115, the security tree controller 114, and the object record controller 116, are shown in one server, it should be understood that they may be implemented in multiple computing devices (e.g., multiple servers for each, a single server for the for each front-end application 113, a single server for each back-end system 115, a server for the security tree controller 114, etc.).

In one implementation, the content management system 110 may be a multi-tenant system where various elements of hardware and software may be shared by one or more customers. For instance, a server may simultaneously process requests from a plurality of customers, and the content storage system 111 may store content for a plurality of customers. In a multi-tenant system, a user is typically associated with a particular customer. In one example, a user could be an employee of one of a number of pharmaceutical companies which are tenants, or customers, of the content management system 110.

In one embodiment, the content management system 110 may run on a cloud computing platform. Users can access content on the cloud independently by using a virtual machine image, or purchasing access to a service maintained by a cloud database provider.

In one embodiment, the content management system 110 may be provided as Software as a Service ("SaaS") to allow users to access the content management system 110 with a thin client.

Figure 2:
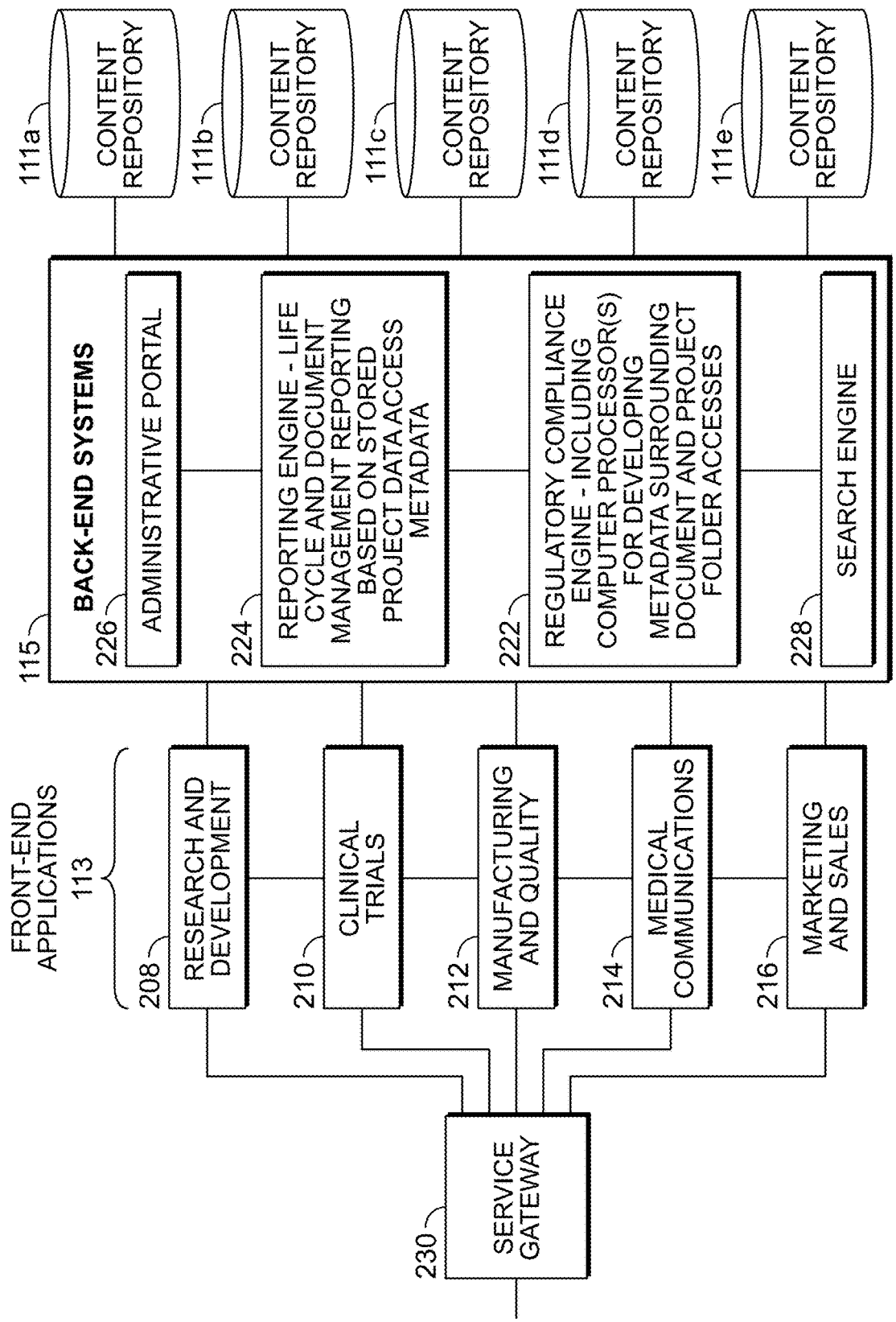
FIG. 2 provides a description of the content management system with additional specific applications and interfaces connected thereto, according to an example embodiment.

FIG. 2 provides a description of the content storage system 111 with additional specific applications and interfaces connected thereto, according to an example embodiment. In an embodiment, this content storage system 111 is a cloud-based or distributed network-based system for consolidating an enterprise's data, oftentimes integrating multiple content repositories in an enterprise into a single system having coordinated control, measuring, and auditing of data creation, access and distribution.

In an embodiment of the content storage system 111 for the life sciences industry, as illustrated in the figure, this content storage system 111 can include specific data collections for the following areas and/or business process-specific front-end applications 113:

The Research & Development (R&D) front-end application 208 provides for an aggregation of materials in support of research and initial clinical trial submissions through building organized and controlled content repositories within the content management system 110, more specifically, the content repository 111a. Elements that can be stored, organized, and managed through this front-end include submission bills of materials, Drug Information Association (DIA) reference models support, and submission-ready renderings. This front-end 208 is designed to provide an interface to the content management system 110 whereby researchers, contract research organizations (CROs), and other collaboration partners can access and/or distribute content through a single controlled document system.

The clinical trials front-end application 210 provides for faster and more organized access to trial documents and reports, while supporting seamless collaboration between sponsors, CROs, sites, investigators and other trial participants. Specific features both ease study and site administration as well as support the DIA trial master file (TMF) reference model. Having this front-end application providing access to the content management system 110 further provides for efficient passing off of content, e.g., in the content repository 111b, between this phase and other phases of the life sciences development process.

The manufacturing and quality application 212 enables the creation, review, approval and distribution of controlled documents across the organization and with external partners in the context of materials control and other manufacturing elements. The application 212 provides functionality in support of the manufacturing process including watermarking, controlled print, signature manifestation and "Read and Understood" signature capabilities. The documents and metadata associated with this process is managed and stored in the content management system 110, or more specifically, the content repository 111c, whereby it can be assured that the related documents are not distributed in contravention of law and company policy.

The medical communications application 214 provides for communications with medical facilities, including call center access, integration, and interface functionality. Particular access control features and metadata associated with this application 214 include expiration and periodic review elements, multi-channel support, global documents and automatic response package generation through the content management system 110. Related documents may be stored in the content repository 111d.

The marketing and sales application 216 provides an end-to-end solution for the development, approval, distribution, expiration and withdrawal of promotional materials. Specific features include support for global pieces, approved Form FDA 2253 (or similar international forms) form generation, online document, and video annotation, and a built-in digital asset library (DAL). Again, the communications may be through the content management system 110, and the promotional materials may be stored in the content repository 111e.

In some embodiments, there are provided a number of back-end system applications 115 that provide for the management of the data, forms, and other communications in the content management system 110. For example, the back-end systems applications 115 may include a regulatory compliance engine 222 to facilitate regulatory compliance, including audit trail systems, electronic signatures systems, and system traceability to comply with government regulations, such as 21 CFR Part 11, Annex 11 and GxP-related requirements. The regulatory compliance engine 222 may include processors for developing metadata surrounding document and project folder accesses so from a regulatory compliance standpoint it can be assured that only allowed accesses have been permitted. The regulatory compliance engine 222 may further includes prevalidation functionality to build controlled content in support of installation qualification (IQ) and/or operational qualification (OQ), resulting in significant savings to customers for their system validation costs.

In some embodiments, the back-end systems 115 may contain a reporting engine 224 that reports on documents, their properties and the complete audit trail of changes. These simple-to-navigate reports show end users and management how content moves through its life cycle over time, enabling the ability to track 'plan versus actual' and identify process bottlenecks. The reporting engine may include processors for developing and reporting life cycle and document management reporting based on stored project data and access metadata relative to documents, forms and other communications stored in the content management system 110.

In some embodiments, the back-end systems 115 can include an administrative portal 226 whereby administrators can control documents, properties, users, security, workflow and reporting with a simple, point-and-click web interface. Customers also have the ability to quickly change and extend the applications or create brand new applications, including without writing additional software code.

In some embodiments, the back-end systems 115 may include a search engine 228 whereby the content management system 110 can deliver simple, relevant and secure searching.

In some embodiments, the content management system 110 may include more back-end systems.

In providing this holistic combination of front-end applications 113 and back-end systems 115, the various applications can further be coordinated and communicated with by the service gateway 230, which in turn can provide for communications with various web servers and/or web services APIs. Such web servers and/or web services APIs can include access to the content and metadata layers of some or all of the various front-end applications 113 and back-end systems 115, enabling seamless integration among complementary systems.

In the context of the described embodiments, content in one repository, e.g., the content repository 111a for the Research & Development (R&D) front-end application 208, may be re-used in another repository (e.g., the content repository 111d) with another front-end application (e.g., the medical communications application 214).

In some embodiments, the content management system 110 may store content for other industries.

Figure 3:
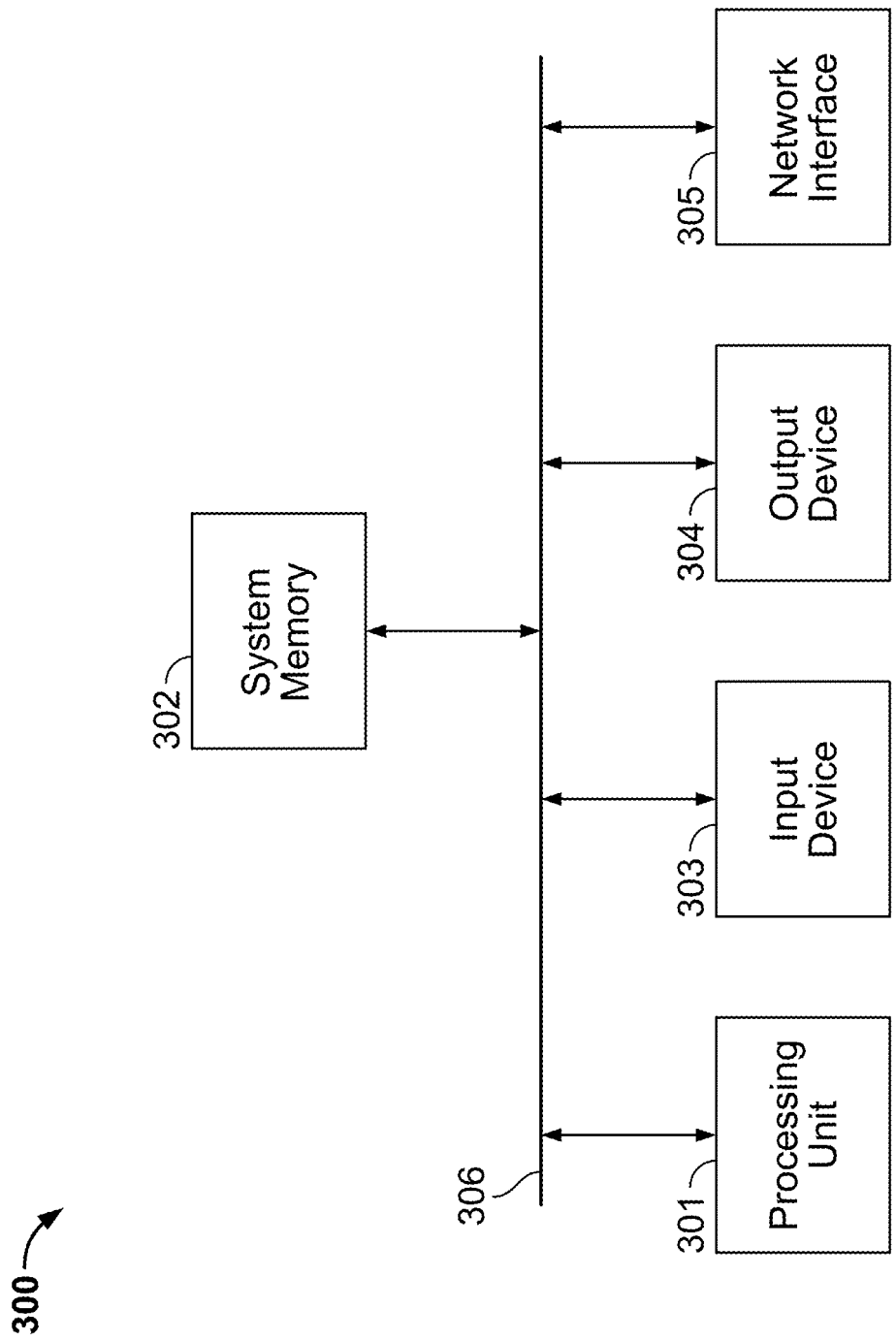
FIG. 3 illustrates an example block diagram of a computing device, according to an example embodiment.

FIG. 3 illustrates an example block diagram of a computing device 300 which can be used as the client computing devices 120a-120n, and the content management server 112 in FIG. 1, according to an example embodiment. The computing device 300 is only one example of a suitable computing environment and is not intended to suggest any limitation as to scope of use or functionality. The computing device 300 may include a processing unit 301, a system memory 302, an input device 303, an output device 304, a network interface 305 and a system bus 306 that couples these components to each other.

The processing unit 301 may be configured to execute computer instructions that are stored in a computer-readable medium, for example, the system memory 302. In some embodiments, the processing unit 301 may be implemented as a general-purpose processor, an application specific integrated circuit (ASIC), one or more field programmable gate array (FPGAs), a digital signal processor (DSP), a group of processing components or other suitable electronic processing components.

The system memory 302 typically includes a variety of computer readable media which may be any available media accessible by the processing unit 301. For instance, the system memory 302 may include one or more memory devices (e.g., RAM, NVRAM, ROM, flash memory, hard disk storage, etc.) that store data and/or computer code for facilitating the various processes described herein. That is, in operation and use, the system memory 302 stores at least portions of instructions and data for execution by the processing unit 301. The system memory 302 may be or include tangible, non-transient volatile memory and/or non-volatile memory.

A user can enter commands and information to the computing device 300 through the input device 303. The input device 303 may be, e.g., a keyboard, a touchscreen input device, a touch pad, a mouse, an RFID scanner, a sensor, a microphone, and/or a pen.

The computing device 300 may provide its output via the output device 304 which may be, e.g., a monitor or other type of display device, an RFID scanner, a sensor, a speaker, or a printer.

The computing device 300, through the network interface 305, may operate in a networked or distributed environment using logical connections to one or more other computing devices, which may be a personal computer, a server, a router, a network PC, a peer device, a smart phone, or any other media consumption or transmission device, and may include any or all of the elements described above. The logical connections may include a network (e.g., the network 150) and/or buses. The network interface 305 may include program logic and/or hardware-based components that connect the computing device 300 to the network 150. For example, the network interface 305 may include any combination of a wireless network transceiver (e.g., a cellular modem, a broadband modem, a Bluetooth transceiver, a Wi-Fi transceiver, a Li-Fi transceiver, etc.) and/or a wired network transceiver (e.g., an Ethernet transceiver). In some embodiments, the network interface 305 includes the hardware and machine-readable media configured to support communication over multiple channels of data communication (e.g., wireless, Bluetooth, near-field communication (NFC). In some embodiments, the network interface 305 includes cryptography logic and capabilities to establish a secure communications session.

Figure 4:
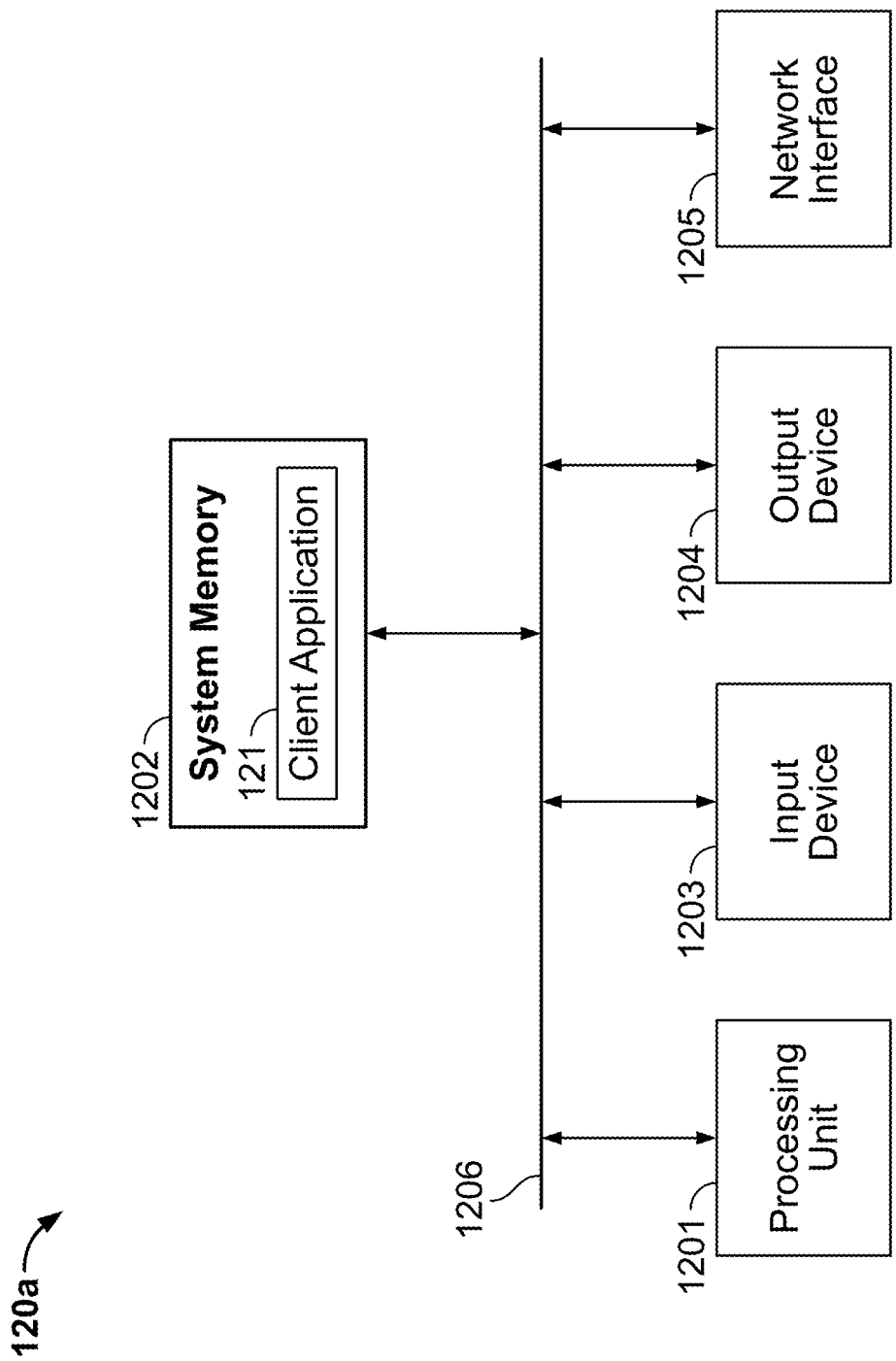
FIG. 4 illustrates an example high level block diagram of a client computing device, according to an example embodiment.

FIG. 4 illustrates an example high level block diagram of a client computing device (e.g., 120a) according to an example embodiment. The client computing device 120a may be implemented by the computing device 300 described above, and may have a processing unit 1201, a system memory 1202, an input device 1203, an output device 1204, and a network interface 1205, coupled to each other via a system bus 1206. The system memory 1202 may store the client application 121.

Figure 5:
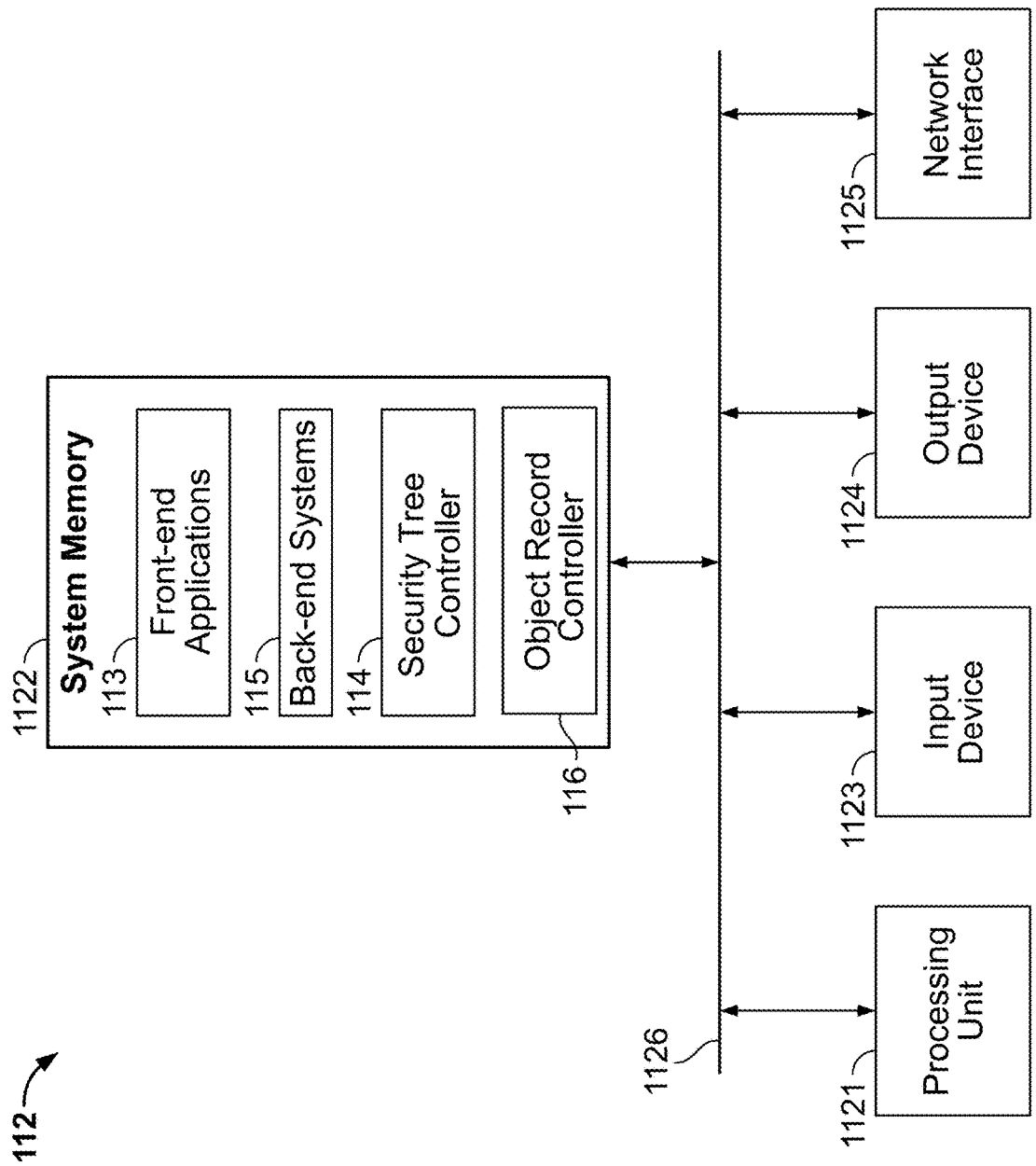
FIG. 5 illustrates an example high level block diagram of the content management server, according to an example embodiment.

FIG. 5 illustrates an example high level block diagram of the content management server 112 according to an example embodiment. The content management server 112 may be implemented by the computing device 300, and may have a processing unit 1121, a system memory 1122, an input device 1123, an output device 1124, and a network interface 1125, coupled to each other via a system bus 1126. The system memory 1122 may store the front-end applications 113, the back-end systems 115, the archive controller 114, and the change data extractor 116.

Figure 6:
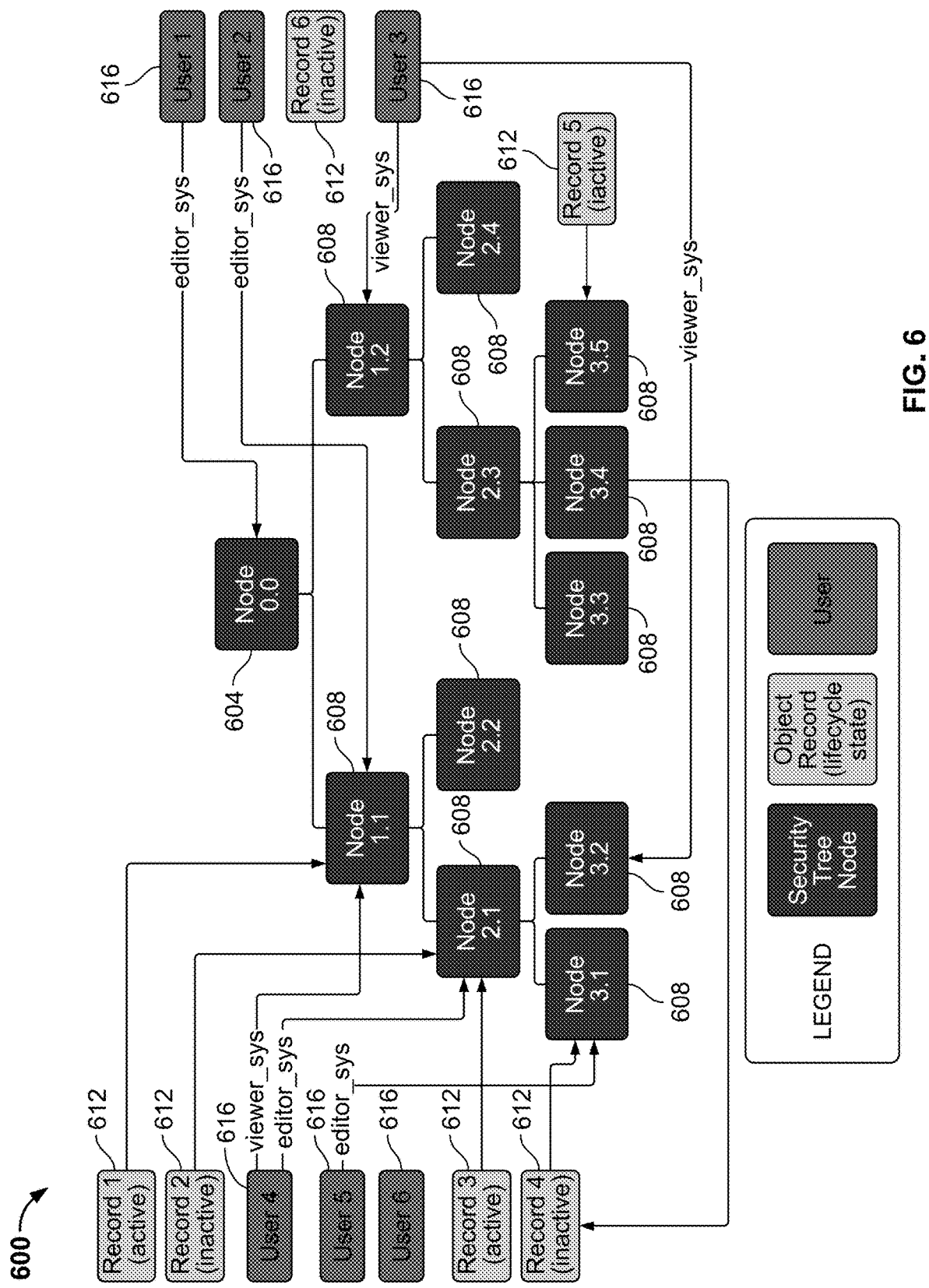
FIG. 6 illustrates an example high level block diagram of a tree data record, according to an example embodiment.

FIG. 6 illustrates an example high level block diagram of a tree data record 600, according to an example embodiment. The tree data record 600 may include a root node data record 604, which includes multiple dependent (or child) node data records 608, which each include multiple dependent node data records 608, and so on, until reaching the bottom level. As used herein "dependent node data records" (such as the dependent node data records 608) and "root node data records" (such as the root node data record 604) may be referred to as "node(s)". The root node data record 604 may not count as a level because it is intrinsic in the tree data record 600. In that regard, the tree data record 600 shown in FIG. 6 includes three levels. In some embodiments, the tree data record 600 may include a minimum of one level and a maximum of fifteen levels of dependent data records 608.

As described herein, each node (e.g., the root node data record 604 and the dependent node data records 608) may each include a field or child record that references the same type of object records (e.g., other nodes), referred to herein as a self-referencing field or child record. Self-referencing fields allow a record to establish a relationship with another record of the same type. This concept is fundamental in modeling hierarchical data structures and various relational scenarios and provides for improved record querying. For instance, because the present systems and methods utilize a tree record including multiple node data records that each includes a self-referencing field, the present systems and methods can faster query and search the nodes. For instance, databases are increasingly optimized for handling recursive queries, which are often used to traverse self-referencing relationships, and certain techniques like materialized path and closure table patterns have emerged to enhance the efficiency of querying hierarchical data. Accordingly, by including the self-referencing field, the present systems and methods can provide for improved record querying.

The root node data record 604 may be a data record that includes one or more dependent or child node data records 608, one or more assigned user accounts 616, and one or more assigned object records 612. In that regard, the tree data record may only include a single root node data record 604 but multiple dependent node data records 608. Likewise, each dependent node data records 608 may include one or more dependent node data records 608, one or more assigned user accounts 616, and one or more assigned object records 612.

The assigned user accounts 616 may be assigned to the specific nodes statically or based on rule criteria, as will be described further herein. Likewise, as shown in FIG. 6, each assigned user account 616 may include a role or permission (e.g., "viewer," "editor," "owner," etc.) which may be used to determine the actions the user account 616 can perform on a specific data record.

Similarly, the assigned object records 612 may be assigned to the specific nodes statically or based on rule criteria, as will be described further herein. Likewise, as shown in FIG. 6, each assigned object record 612 may include a lifecycle state (e.g., "active," "inactive," "open," "submitted," "superseded," etc.) which may be used to determine the actions the user can perform on the specific data record of the assigned object record 612.

In some embodiments, each parent node data record (including the root node data record 604 and the dependent node data records 608) may include up to 100 child node data records. In some embodiments, each node data object (including the root node data record 604 and the dependent node data records 608) may include up to 500 assigned user accounts 616 and up to 65 assigned object records 612. In some embodiments, each node data object may include an unlimited number of assigned object records 612, which can be generated based on up to 65 data objects (e.g., the data structures used to substantiate the object records 612).

In some embodiments, as will be described further herein, the content management server 112 (and more specifically the security tree controller 114) may maintain and update the tree data record 600. For instance, when a dependent node 608 of the security tree data record 600 includes no user account assignments and/or data record assignment (i.e., are empty), the content management server 112 may remove the empty dependent nodes 608. By automatically removing empty dependent nodes, the present systems and methods provide improvements to data management systems and use less memory overall by reducing security tree bloat and processing power to traverse the tree. For instance, by removing nodes which have no user accounts and/or object records, the content management server 112 does not need to reach or traverse the empty nodes when traversing the tree, thereby saving on processing power. Likewise, by removing empty nodes, the content management server 112 does not need to store and manage the empty nodes, thereby saving on memory and storage.

Figure 7:
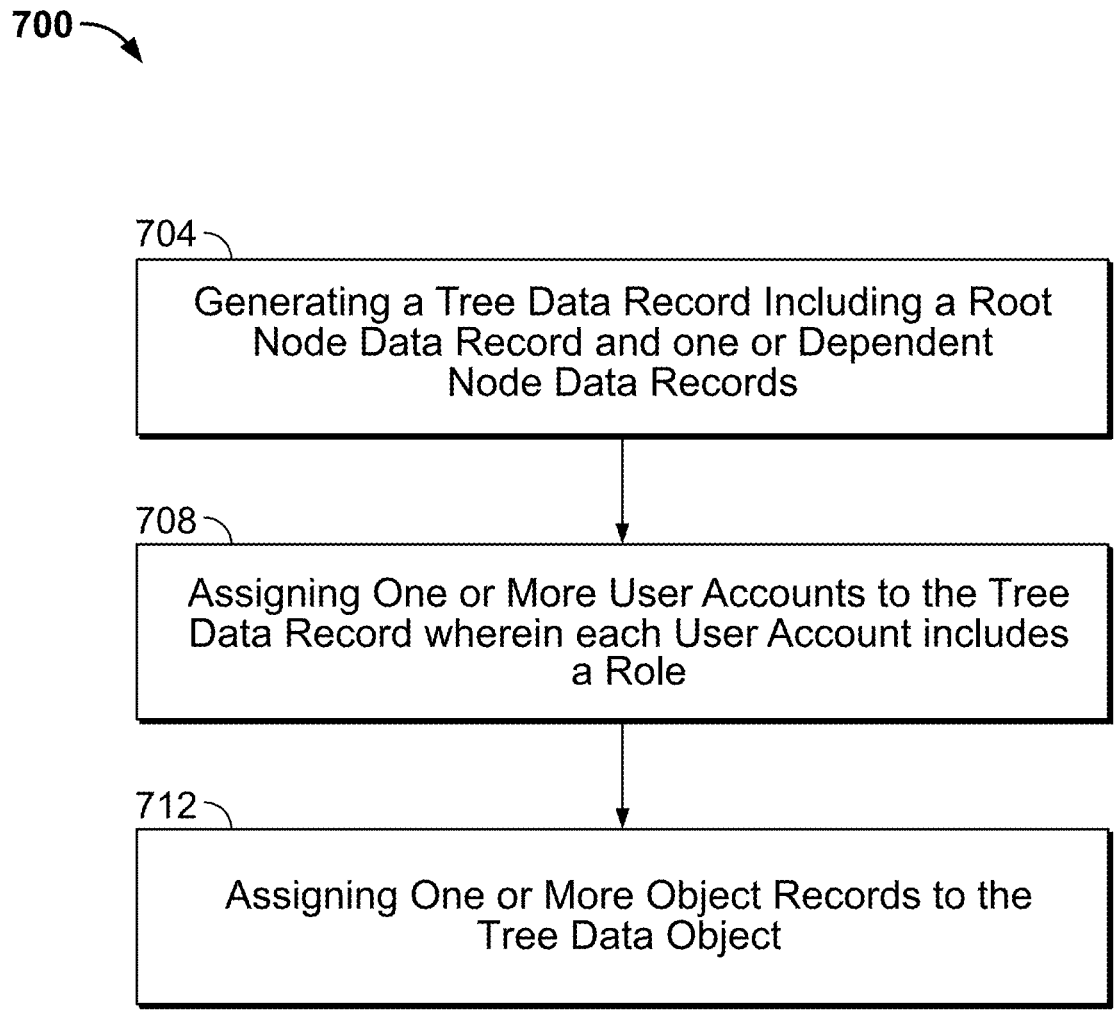
FIG. 7 is a flow diagram of a method for generating a tree data record, according to an example embodiment.

Referring now to FIG. 7, a method 700 of generating a tree data record is shown, according to an example embodiment. Method 700 can be carried out by the system of FIG. 1. More particularly, the method 700 can be carried out by the content management server 112.

Method 700 commences at step 704 at which the content management server 112 generates a tree data record including root node data record and one or more dependent node data records (i.e., nodes). In some embodiments, prior to step 704, the content management server 112 may receive a request to generate a tree data record (also referred to as a security tree data record, a security tree, and a tree). The request may include or identify the number of levels of the tree data record and/or a general structure of the tree data record. For instance, the request may include the number 6. Accordingly, at step 704, the content management server 112 may generate a security tree data record including the root node data record and six corresponding dependent node data records (to get to the level of 6). In another example, the request may identify the overall structure of the tree data record (three levels, a first level with two dependent node data records, each first level dependent node data record including two dependent node data records of a second level, the first node data record of the second level including two dependent node data records, etc. (see FIG. 6 for one example).

In some embodiments, the request may include a set of static user assignments (e.g., user assignments that include a fixed hierarchy). For instance, each tenant may include a relatively static user assignment for their corporate structure (e.g., a sales rep reports to a sales manager who reports to a corporate VP, who reports to the CEO, etc.). Accordingly, the content management server 112 may generate the tree data record to correspond with or mirror the fixed hierarchy. In one specific example, a static hierarchy may include a chief executive officer (CEO), two vice presidents (VPs) who report to the CEO, four managers (two who report to the first VP and two who report to the second VP), and five sales representatives (reps) (one rep who reports to the first manager, one rep who reports to the second manager, two reps who reports to the third manager, and one rep who reports to the fourth manager. In other embodiments, the request may include a set of static object record assignments (e.g., object records that include a fixed hierarchy).

Accordingly, at step 704, the content management server 112 may generate the tree data record based on/to mimic the static hierarchy (e.g., of the static user assignment, of the static object record assailments, etc.). For instance, using the static user assignment example, the content management server 112 may generate a tree data record including a root node data record (for the CEO), two first-level dependent node data records depending from the root node data record (for each VP), four second-level dependent node data records (for each manager) (two second-level dependent node data records which depend from a first first-level dependent node data record and two second-level dependent node data records which depend from a second first-level dependent node data record), and five third-level dependent node data records (for each sales rep). The five third-level dependent node data records include a first third-level dependent node data record which depends from the first second-level dependent node data record; a second third-level dependent node data record which depends from the second second-level dependent node data record; a third and fourth third-level dependent node data records which each depends from the third second-level dependent node data record; and a fifth third-level dependent node data record which depends from the fourth second-level dependent node data record.

Once the content management server 112 has generated the tree data record, the method 700 proceeds to step 708 at which the content management server 112 assigns one or more user accounts to the tree data record. For instance, at step 708, the content management server 112 may assign the user accounts to one or more of the dependent node data records and/or the root node data record. As described herein, each user account may be a user account data record including a username, a user country or region (e.g., U.S.A., Europe, France, Southeast Asia, etc.), a user address (e.g., email address, IP address, FTP address, etc.), one or more job title(s), a user role or permissions (e.g., edit, view, owner, etc.), one or more assigned tree node data records, and the like.

In some embodiments, the content management server 112 may assign the user accounts to the node data record(s) by adding a link (e.g., a reference pointer, a uniform resource locator (URL), a database index, etc.) to the node data record(s) and/or to the user account(s). For instance, each node data record (the root node data record and the dependent node data records) may include a child data record with a type of user account. Accordingly, the content management server 112 may populate the child data record with a link (e.g., a reference pointer) to the corresponding user account assigned to the node data record.

In some embodiments, the content management server 112 may assign user accounts to the tree based on static assignments and based on user rule criteria. For instance, the content management server 112 may receive a set of static user account assignments, and assign the user accounts to the corresponding node data records at step 708 (e.g., user account of the CEO to the root node data record, user account of each VP to the first first-level dependent node data record and the second first-level dependent node data record, respectively, etc.).

Likewise, the content management server 112 may receive one or more user rule criteria which are used to assign specific user account(s) to the tree data record. For instance, the rule criteria may specify specific user role(s), username(s), job titles, product/applications, regions/countries, and the like. In one example, the rule criteria may include the job title of "sales representative," and the region of "USA". Further, the rule criteria may identify or be associated with a specific node data record of the tree data record. Accordingly, at step 708, the content management server 112 may determine a specific user account fulfills the rule criteria and assign the user account to the specific node data record. In comparison, if the specific user account does not fulfill the rule criteria, the user account may not be assigned to the specific node data record. In another example, the rule criteria may include the job title of "sales representative," and an application or product of "Clinical Trial Management". Further, the rule criteria may identify or be associated with a specific node data record of the tree data record. In some embodiments, the content management server 112 may evaluate the rule criteria on generation of the specific node data record and/or on generation of the specific user account.

In some embodiments, a user account may be assigned to multiple nodes of the tree data record. For instance, a first user account may be assigned to a first-level node data record, a third-level node data record, and a fifth-level node data record. In some embodiments, a user account may be assigned to a maximum of 100 nodes. In this regard, a user account may be assigned to multiple un-related hierarchical portions of the tree data record. For instance, referring back to FIG. 6, user account 616 "3" may be assigned to dependent node data record 608 "3.2" and dependent node data record 608 "1.2," which are unrelated and do not overlap. The nodes are unrelated in that they do not appear in the same hierarchy, outside of the root node data record 604. In this regard, higher-level related nodes may be nodes from which the present node is dependent or located below the hierarchy of the tree (see FIG. 6), whereas lower-level related nodes may be nodes that are dependent or located below the present node on the hierarchy of the tree (see FIG. 6).

Additionally, multiple user accounts may be assigned to the same node. For instance, referring back to FIG. 6, both user account 616 "5" and user account 616 "2" may be assigned to dependent node data record 608 "1.1". In some embodiments, up to a maximum of 500 user accounts may be assigned to a single node.

Once the content management server has assigned the one or more user accounts to the tree data record, the method 700 proceeds to step 712 at which the content management server 112 assigns one or more data records to the tree data object. For instance, at step 712, the content management server 112 may assign the object records to one or more of the dependent node data records and/or the root node data record.

It should be understood that the object records, the node data records, and the user account data records may each be object records including data therein, but the object records may be of a different type than the node data records and the user account data records. For instance, the object data records may be instantiated based on a specific object type of one of the front end application 113 and/or the back-end system 115. In one example, the object data records may include a sales territory object record associated with the marketing and sales application 216. In another example, the object records may include a quality test object record associated with the manufacturing and quality application 212. In another example, the object records may include a individual case safety report object record associated with the research and development application 208. In this regard, the object records may include application specific object/data records.

In some embodiments, the content management server 112 may assign the object records to the node data record(s) by adding a link (e.g., a reference pointer, a uniform resource locator (URL), a database index, etc.) to the node data record(s) and/or to the object records. For instance, each node data record (the root node data record and the dependent node data records) may include a child data record with no specific type. Accordingly, the content management server 112 may populate the child data record with a link (e.g., a reference pointer) to the corresponding object record assigned to the node data record.

In some embodiments, the content management server 112 may assign object records to the tree based on static assignments and based on object record rule criteria. For instance, the content management server 112 may receive a set of static object record assignments, and assign the user accounts to the corresponding node data records at step 712 (e.g., a case object record to the root node data record, a medical product registration object record to the first first-level dependent node data record and the second first-level dependent node data record, respectively, etc.).

Likewise, the content management server 112 may receive one or more object record rule criteria which are used to object records to the tree data record. For instance, the rule criteria may specify specific field values of the object records (e.g., "country_v==USA," "date v>=Mar. 1, 2024," "user_v=="paul_s@veeva.com" etc.), specific objects (e.g., the individual case safety report data object), specific product or applications, regions, and the like. In one example, the rule criteria may include a specific data object. Accordingly, whenever an object record is instantiated/generated based on the specific data object, the content management server 112 may assign the generated object record to the tree data record. In another example, the rule criteria may specify a specific value of an object record field. Accordingly, if the object is created and includes the specific value or the object record is updated to include the specific value, the content management server 112 may assign the generated object record to the tree data record.

Additionally, the rule criteria may identify or be associated with a specific node data record of the tree data record. Accordingly, at step 712, the content management server 112 may determine a specific object record fulfills the rule criteria and assign the object record to the specific node data record. In comparison, if the specific object record does not fulfill the rule criteria, the object record may not be assigned to the specific node data record. In some embodiments, the content management server 112 may evaluate the rule criteria on generation of the specific node data record, on generation of the specific object record, and/or on update of the specific object record.

In some embodiments, an object record may be assigned to multiple nodes of the tree data record. For instance, a first object record may be assigned to a first-level node data record, a third-level node data record, and a fifth-level node data record. In some embodiments, an object record may be assigned to a maximum of 100 nodes. In this regard, an object record may be assigned to multiple un-related hierarchical portions of the tree data record. For instance, referring back to FIG. 6, the object record 612 "4" may be assigned to dependent node data record 608 "3.1" and dependent node data record 608 "3.4," which are unrelated and do not overlap. Further, multiple object records may be assigned to the same node. In some embodiments, up to a maximum of 25,000 object records may be assigned to a single node.

By providing for up to 25,000 object records in a single node, the present systems and methods provide a security architecture that can be leveraged across large data loads while still providing a reliable and consistent runtime environment. For instance, if a single node could include a large number of object records (e.g., 500,000 object records, 1 million object records, etc.), the traversal of the tree and tagging of data records would consume a lot of processing power and memory, thereby disrupting the other functions of the system (e.g., modifying data records, etc.). Likewise, if a single node could only include a small number of data records (e.g., 100 data records, 1,000 data records, 5,000 data records), the security architecture disclosed herein would only be able to be applied to small data loads. In that regard, the value of 25,000 data records per node provides a technical improvement to security architectures, by providing for a security architecture that can be leveraged across large data loads while still providing a reliable and consistent runtime environment.

In some embodiments, each time the content management server 112 assigns an object record to the tree data record, the content management server 112 may traverse the tree and tag or generate an indication in the object record (e.g., a link, a reference pointer) for each node which has access to the object record. For instance, referring back to FIG. 6, the object record 612 "4" may be assigned to dependent node data record 608 "3.1" and dependent node data record 608 "3.4," which are unrelated and do not overlap. Accordingly, the content management server 112 may traverse the tree for dependent node data record 608 "3.1" and determine higher-level related dependent nodes 608 2.1, 1.1, and 0.0, which have access to the object record. Then, the content management server 112 may traverse the tree for dependent node data record 608 "3.4,". Accordingly, the content management server 112 may traverse the tree for dependent node data record 608 "3.4" and determine dependent nodes 608 2.3, 1.2, and 0.0. Then, the content management server 112 may modify the object record to include a node tag or identify dependent nodes 608 2.3, 2.1, 1.2, 1.1, and 0.0. In some embodiments, the node tag may be an identifier (e.g., a unique identifier, a name, a URL or hyperlink, etc.) associated with the corresponding dependent nodes. For instance, dependent node 608 2.3 may include a unique identifier 112233112211. Accordingly, the content management server 112 may modify the object record to include the unique identifier of the dependent node 608. As will be described further herein, the tags or indications may be used, by the content management server 112, at runtime to determine record privileges.

In some embodiments, at step 712, the content management server 112 may assign the object record to a group associated with the node to which the object record is to be assigned. For instance, using FIG. 6 as an example, content management server 112 may generate a group associated with each leave or lowest-level node data record (e.g., nodes 608 3.1, 3.2, 3.3, etc.). Then, the content management server 112 may generate a group associated with each second level node data record (e.g., nodes 608 2.1, 2.2, 2.3, etc.). Likewise, for each node that includes dependent nodes, the content management server 112 may assign the corresponding group to the newly generated group. For instance, the group associated with node 608 2.1 may be assigned the group for node 608 3.1 and node 608 3.2, and the group associated with node 608 2.3 may be assigned the group for node 608 3.3, node 608 3.4, and node 608 3.5. This process of generating groups and cascading group assignments may be repeated until reaching the root node. Accordingly, in response to an object record being assigned to node 608 1.1, the content management server 112 may assign the object record to a group associated with node 608 1.1, which includes the groups for node 608 2.1 and node 608 2.2. Then, at runtime, the content management server 112 may determine if a user account has access to a data record by parsing the groups.

Figure 8:
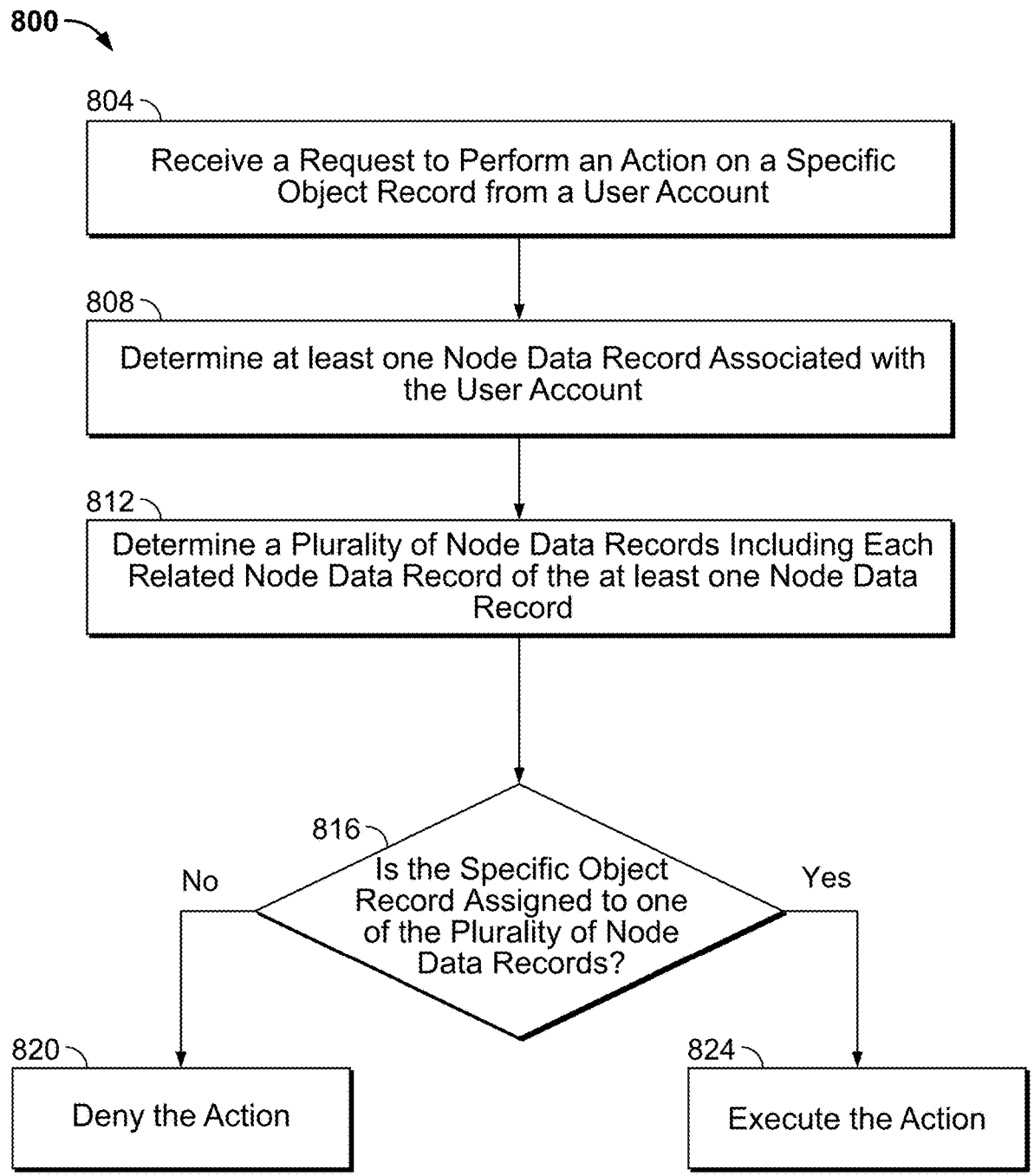
FIG. 8 is a flow diagram of a method for executing an action on an object record, according to an example embodiment.

Referring now to FIG. 8, a method 800 of executing an action on an object record is shown, according to an example embodiment. While different overall, it should be understood that any steps or discussion of the method 800 may be applied or included within the methods 700, and vice versa, and that such combinations are included within the scope of the present disclosure. For example, content management server 112 may perform the method 700 to generate a tree data record and then perform the method 800 to execute an action on a specific object record based on determining the user account has permission to do so based on the tree data record. Method 800 can be carried out by the system of FIG. 1. More particularly, the method 800 can be carried out by the content management server 112.

Method 800 commences at step 804 at which the content management server 112 receives a request to perform an action (e.g., modify/update, create, delete, etc.) on a specific object record. In some embodiments, the request may be received from a specific user account. For instance, the content management server 112 may determine the request is from a specific user account based on the request being received from specific client computing device (e.g., 120a) associated with the user account. In another example, the content management server 112 may determine the request is from a specific user account based on the request being received from an address (e.g., email address, IP address, FTP address, etc.) associated with the user account. In another example, the content management server 112 may determine the request is from a specific user account based on the request including a key or password (e.g., a limited use key (LUK), a password, a cryptographic private key, etc.) of the specific user account.

Once the content management server 112 has received the request to perform an action, the method 800 proceeds to step 808 at which the content management server 112 determines at least one node data record associated with the user account. For instance, at step 808, the content management server 112 may determine the user account is assigned to one or more node data records based on the link included in the user account. In one example, a user account may be assigned to three node data records (e.g., a first-level dependent node, a second-level dependent node, and a fifth-level dependent node). Accordingly, at step 808, the content management server 112 may determine each node data record associated with the user account.

Once the content management server 112 has determined each node data record associated with the user account, the method 800 proceeds to step 812 at which the content management server 112 determines multiple dependent node data records based on the determined node data record(s) of step 808.

In some embodiments, the content management server 112 may determine each lower-level node data record related to the determined node data records of step 808. For instance, using the example above of a first-level dependent node, a second-level dependent node, and a fifth-level dependent node, the first-level dependent node may include 25 related nodes. Accordingly, the content management server 112 may determine each of the 25 related nodes by traversing the lower-level related dependent nodes of the first-level dependent node (e.g., to the second-level dependent nodes to the third-level dependent nodes, and so on until reaching the bottom of the tree data record). Likewise, the second-level dependent node may include 15 related nodes. Accordingly, the content management server 112 may determine each of the 15 related nodes by traversing the dependent nodes of the second-level dependent node. Lastly, the fifth-level dependent node may include 2 related (and dependent) nodes. Accordingly, the content management server 112 may determine each of the 2 related nodes by traversing the dependent nodes of the fifth-level dependent node. Then, in response to the nodes determined at step 808 being unrelated, the content management server 112 may determine 45 nodes at step 812 (e.g., 1+1+1+25+15+2).

Once the content management server 112 has determined the multiple nodes, the method 800 proceeds to step 816 at which the content management server 112 determines if the specific object record is assigned to one of the multiple nodes. For instance, at step 816, the content management server 112 may determine if the object record includes a tag or indication that matches any of the multiple nodes. In one example, the object record may be previously assigned to a specific node (e.g., node 2.1) and tagged or modified to identify the specific node and the corresponding related nodes (e.g., nodes 2.1, 1.1, and 0.0). Accordingly, at step 816, the content management server 112 may determine if at least one tagged node of the object record matches at least one of the nodes determined at step 812. If there is no match, the method 800 may proceed to step 820 at which the content management server 112 denies the action. In some embodiments, the content management server 112 may generate and output a notification indicating the action was denied. In comparison, if there is a match the method 800 may proceed to step 824 at which the content management server 112 executes the action.

In some embodiments, the content management server 112 may only execute the action in response to the action meeting the role or permission of the user account of the request. For instance, the content management server 112 may determine if the record privileges of the user account allow for the user account to perform the action. Accordingly, if the permission of the user account meets the action, the content management server 112 may proceed to step 824 and execute the action. In comparison, if the permission does not meet the action, the content management server may proceed to step 820.

In some embodiments where each object record is assigned to a specific group, the content management server 112 may determine if the specific object record is assigned to a group that matches a group of the multiple nodes. For instance, the specific object record may be assigned to a first group, a second group included in the first group, and a third group included in the second group. Likewise, the nodes may collectively be assigned to the first group, a fourth group, and a fifth group. Accordingly, at step 816, the content management server 112 may determine if at least assigned group of the object record matches at least one assigned group the nodes determined at step 812.

Referring now to FIG. 9, a user interface shown and displayed to the user of the one or more client computing devices 120*a-n* are shown, according to example embodiments. As described herein, the user interface of FIG. 9 may be one or more of web interfaces generated by the content management system and rendered by each of the client computing devices 120*a-n* as part of a web application or graphical user interfaces downloaded and generated by each of the client computing devices 120*a-n* as part of a software application (e.g., a mobile application, etc.). Further, the user interface of FIG. 9 allows for communication between the user and the content management system 110 via the respective client computing device (e.g., 120*a*) (specifically via the input and output devices (e.g., 303 and 304), respectfully). Through interaction with the various user interfaces, the user may provide user input, feedback, and other data requested by the content management system 110. In this regard, it should be understood that each interaction described herein by the user with the user interface of FIG. 9 may be provided to one or more of the client computing devices 120*a-n* and then transmitted to the content management system 110 and that each action described herein as occurring to the respective client computing device 120*a-n* (e.g., navigating to a certain page, generating a popup, etc.) may be performed by the content management system 110.

Referring now to FIG. 9, the user role page 900 which can be displayed on a display of one of the client computing devices 120*a-n*, is shown. In general, the user role page 900 provides the user with an interface to review and manage the roles of a specific user account. As shown, the user role page 900 includes a user account selection section 904 and a corresponding role field 916. In use, the user of a client device (e.g., 120*a*) may select the specific role they are inquiring about via the role drop-down menu 908 and then enter a specific username in the username field 912. In response, the content management server 112 may retrieve the user account associated with the username of the username field 912, and output the user account's role(s) for display in the role field 916.

The embodiments described herein have been described with reference to the drawings. The drawings illustrate certain details of specific embodiments that implement the systems, methods, and programs described herein. However, describing the embodiments with drawings should not be construed as imposing on the disclosure any limitations that may be present in the drawings.

It should be understood that no claim element herein is to be construed under the provision of 35 U.S.C § 112(f), unless the element is expressly recited using the phrase "means for."

As used herein, the term "circuit," "controller," "extractor," or "application(s)"/"app(s)" may include hardware configured to execute the functions described herein. In some embodiments, each respective "circuit," "controller," "extractor," or "application(s)"/"app(s)" may include machine-readable media for configuring the hardware to execute the functions described herein. The "circuit," "controller," "extractor," or "application(s)"/"app(s)" may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit," "controller," "extractor," or "application(s)"/"app(s)" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexors, registers, capacitors, inductors, diodes, wiring, and so on.

The "circuit," "controller," "extractor," or "application(s)"/"app(s)" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be configured to perform or otherwise execute certain operations independent of one or more co-processors. In other embodiments, two or more processors may be coupled via a bus to enable independent, parallel, pipelined, or multi-threaded instruction execution. Each processor may be implemented as one or more general purpose processors, application specific integrated circuits (ASICs), field programmable gate arrays (FPGAs), digital signal processors (DSPs), or other suitable electronic data processing components configured to execute instructions provided by the memory. The one or more processors may take the form of a single core processor, a multi-core processor (e.g., dual core, quad core, etc.), microprocessor, etc. In some embodiments, the one or more processors may be external to the apparatus. For example, the one or more processors may be a remote processor (e.g., a cloud-based processor). Alternatively or additionally, the one or more processors may be internal and/or local to the apparatus. In this regard, a circuit or components thereof may be disposed locally (e.g., as part of a local server, a local computing system) or remotely (e.g., as part of a remote server such as a cloud-based server). To that end, a "circuit" as described herein may include components that are distributed across one or more locations. Further, each of the circuits described herein may be distributed across one or more locations (e.g., each as part of one or more remote servers).

An example system for implementing the overall system or portions of the embodiments might include a general-purpose computing device in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile storage media may take the form of ROM, flash memory (e.g., flash memory such as NAND, 3D NAND, NOR, 3D NOR), EEPROM, MRAM, magnetic storage, hard disks, optical disks, etc. Combinations of the above are also included within the scope of machine-readable media. In this regard, machine-executable instructions comprise, for example, instructions and data which cause a general-purpose computer, special purpose computer, or special purpose processing machine to perform a certain function or group of functions. Each respective memory device may be operable to maintain or otherwise store data relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, a joystick, or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principles of the disclosure and its practical application to enable one skilled in the art to utilize the various embodiments and with various modifications as are suited to the particular use contemplated. Other substitutions, modifications, changes, and omissions may be made in the design, operating conditions and embodiment of the embodiments without departing from the scope of the present disclosure as expressed in the appended claim.

What is claimed is:

1. A method for providing secure and hierarchical access to an object record, the method comprising:
   generating, by a content management server, a tree data record including a root node data record and a plurality of dependent node data records,
   wherein the plurality of dependent node data records includes a first dependent node data record and a second dependent node data record depending from the first dependent node data record;
   receiving, by the content management server, a user rule criteria;
   determining, by the content management server, a user account fulfills the user rule criteria;
   assigning, by the content management server and in response to the user account fulfilling the user rule criteria, the user account to the first dependent node data record;

assigning, by the content management server, the object record to at least one dependent node data record of the plurality of dependent node data records or the root node data record;
modifying, by the content management server, the object record to include at least one node tag;
receiving, by the content management server, a request to perform an action on the object record,
wherein the request is received from a client computing device associated with the user account;
determining, by the content management server, the first dependent node data record based on the user account being assigned to the first dependent node data record;
determining, by the content management server, the second dependent node data record based on the second dependent node data record depending from the first dependent node data record;
determining, by the content management server, the at least one node tag of the object record is associated with at least one of the first dependent node data record or the second dependent node data record; and
executing, by the content management server and in response to determining the at least one node tag of the object record is associated with at least one of the first dependent node data record or the second dependent node data record, the action on the object record.

2. The method of claim 1, further comprising:
receiving, by the content management server, an object record rule criteria; and
determining, by the content management server, the object record fulfills the object record rule criteria,
wherein the object record is assigned to at least one dependent node data record of the plurality of dependent node data records or the root node data record in response to the object record fulfilling the object record rule criteria.

3. The method of claim 1, further comprising:
receiving, by the content management server, a static object record assignment,
wherein the object record is assigned to at least one dependent node data record of the plurality of dependent node data records or the root node data record based on the static object record assignment.

4. The method of claim 1, wherein the plurality of dependent node data records further includes a third dependent node data record depending from the second dependent node data record and a fourth dependent node data record depending from the second dependent node data record, and wherein the method further comprises:
determining, by the content management server, the third dependent node data record based on the third dependent node data record depending from the second dependent node data record; and
determining, by the content management server, the fourth dependent node data record based on the fourth dependent node data record depending from the second dependent node data record.

5. The method of claim 1, wherein each dependent node data record includes a self-referencing field which includes a link to a related dependent node data record.

6. The method of claim 1, wherein the user account includes a record privilege, and wherein the method further comprises:
determining, by the content management server, the record privilege of the user account meets the action of the request.

7. The method of claim 1, wherein the action is a view action, a delete action, or an update action.

8. The method of claim 1, wherein the user rule criteria includes at least one of: a region or an application.

9. The method of claim 8, wherein the user rule criteria includes an application, wherein the object record is associated with the application, and wherein the application is at least one of: a research and development application, a clinical trial application, a quality application, a medical communications application, or a sales application.

10. The method of claim 1, wherein the first dependent node data record depends from the root node data record.

11. A content management system for providing secure and hierarchical access to an object record, comprising:
a content management server comprising a processor and a memory, the content management server configured to:
generate a tree data record including a root node data record and a plurality of dependent node data records,
wherein the plurality of dependent node data records includes a first dependent node data record and a second dependent node data record depending from the first dependent node data record;
assign the user account to the first dependent node data record;
receive an object record rule criteria;
determine the object record fulfills the object record rule criteria;
assign, in response to the object record fulfilling the object record rule criteria, the object record to at least one dependent node data record of the plurality of dependent node data records or the root node data record;
modify the object record to include a link to at least one group of the object record;
receive a request to perform an action on the object record,
wherein the request is received from a client computing device associated with the user account;
determine the first dependent node data record based on the user account being assigned to the first dependent node data record;
determine the second dependent node data record based on the second dependent node data record depending from the first dependent node data record;
determine at least one of the first dependent node data record or the second dependent node data record are associated with the at least one group of the object record; and
execute, in response to determining the at least one of the first dependent node data record or the second dependent node data record are associated with the at least one group of the object record, the action on the object record.

12. The content management system of claim 11, wherein the content management server is further configured to:
receive a user rule criteria; and
determine the user account fulfills the user rule criteria,
wherein the user account is assigned to the first dependent node data record in response to the user account fulfilling the user rule criteria.

13. The content management system of claim 11, wherein the content management server is further configured to:
receive a static user assignment,
wherein the user account is assigned to the first dependent node data record based on the static user assignment.

14. The content management system of claim 11, wherein the plurality of dependent node data records further includes a third dependent node data record depending from the second dependent node data record and a fourth dependent node data record depending from the second dependent node data record, and wherein the content management server is further configured to:
- determine the third dependent node data record based on the third dependent node data record depending from the second dependent node data record; and
- determine the fourth dependent node data record based on the fourth dependent node data record depending from the second dependent node data record.

15. The content management system of claim 11, wherein each dependent node data record includes a self-referencing field which includes a link to a related dependent node data record.

16. The content management system of claim 11, wherein the user account includes a record privilege, and wherein the content management server is further configured to:
- determine the record privilege of the user account meets the action of the request.

17. The content management system of claim 11, wherein the action is a view action, a delete action, or an update action.

18. The content management system of claim 11, wherein the object record rule criteria includes at least one of: a field of the object record, a region, or an application.

19. The content management system of claim 18, wherein the object record rule criteria includes an application, wherein the object record is associated with the application, and wherein the application is at least one of: a research and development application, a clinical trial application, a quality application, a medical communications application, or a sales application.

20. The content management system of claim 11, wherein the first dependent node data record depends from the root note data record.

* * * * *